(12) United States Patent
Peng et al.

(10) Patent No.: US 8,574,318 B2
(45) Date of Patent: Nov. 5, 2013

(54) PREPARATION METHOD OF OPTICAL COLORFUL POLYESTER FILM USING MICROWAVE TECHNIQUE

(76) Inventors: Bo Peng, Wuxi (CN); Wei Wei, Wuxi (CN); Chao Gao, Wuxi (CN)

(*) Notice: Subject to any disclaimer, the term of this patent is extended or adjusted under 35 U.S.C. 154(b) by 0 days.

(21) Appl. No.: 13/390,814

(22) PCT Filed: Aug. 12, 2010

(86) PCT No.: PCT/CN2010/001224
§ 371 (c)(1),
(2), (4) Date: Feb. 16, 2012

(87) PCT Pub. No.: WO2011/020289
PCT Pub. Date: Feb. 24, 2011

(65) Prior Publication Data
US 2012/0144602 A1  Jun. 14, 2012

(30) Foreign Application Priority Data

Aug. 17, 2009 (CN) .......................... 2009 1 0023607

(51) Int. Cl.
| | | |
|---|---|---|
| *D06P 5/20* | (2006.01) | |
| *D06P 5/02* | (2006.01) | |
| *D06P 5/04* | (2006.01) | |
| *D06P 3/52* | (2006.01) | |
| *D06P 1/16* | (2006.01) | |
| *D06P 1/90* | (2006.01) | |

(52) U.S. Cl.
USPC ........................................ 8/444; 8/506; 8/636

(58) Field of Classification Search
USPC ...................... 8/506, 512, 444, 636
See application file for complete search history.

(56) References Cited

U.S. PATENT DOCUMENTS

| 5,162,046 A | 11/1992 | Mercado |
| 6,316,531 B1 | 11/2001 | Garware et al. |
| 6,464,733 B2 * | 10/2002 | Ryser ................................. 8/444 |
| 2003/0144419 A1 * | 7/2003 | Krishnan et al. ................ 525/88 |

FOREIGN PATENT DOCUMENTS

| CN | 1082070 A | 2/1994 |
| CN | 1243133 A | 2/2000 |
| CN | 1552756 A | 12/2004 |
| CN | 101671965 | * 3/2010 |

OTHER PUBLICATIONS

Chiao-Cheng "Microwave Dyeing of Regular and carrierless Dyeable Polyesters with Disperse Dyes" 1977.*
Chen, Qiliang, et al., Latest Development of Dyeing Methods of Polyerster Fiber (1), Dye Industry, vol. 35, No. 3, 1998, Mar. 1998, pp. 41-43.

* cited by examiner

*Primary Examiner* — Lorna M Douyon
*Assistant Examiner* — Amina Khan
(74) *Attorney, Agent, or Firm* — Jacobson Holman; Jiwen Chen

(57) ABSTRACT

A process for preparing an optical colored polyester film using microwave technique comprises the following steps: microwave dyeing treatment by passing a polyester film through a disperse dye suspension with a steady water phase in a dye-pool comprising a microwave generator; rinsing with water; rinsing with solvent; finally drying treatment, and then uniform optical colored films with various colors are obtained. The optical colored films are used as optical filters or optical protection films and as glass window films for automobile, and domestic and office windows.

9 Claims, 1 Drawing Sheet

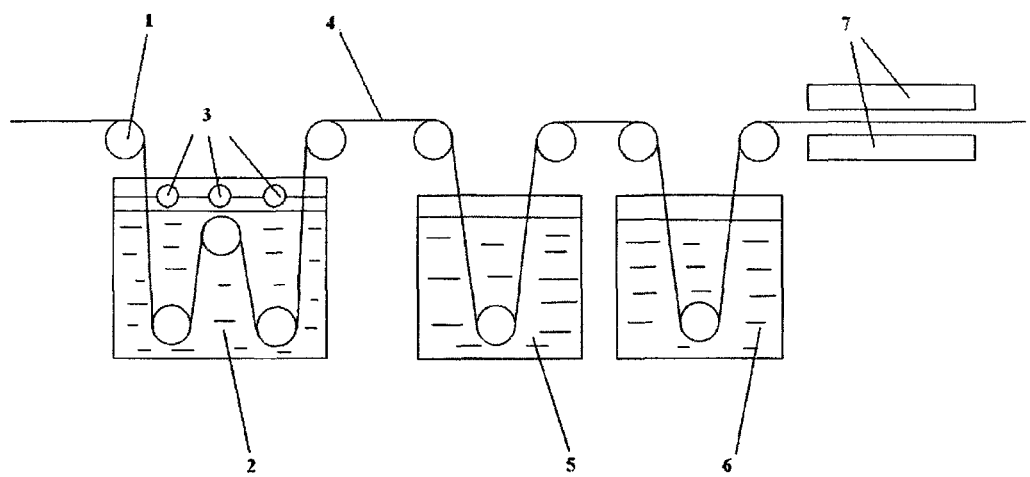

PREPARATION METHOD OF OPTICAL COLORFUL POLYESTER FILM USING MICROWAVE TECHNIQUE

This is a U.S. national stage application of PCT Application No. PCT/CN2010/001224 under 35 U.S.C. 371, filed Aug. 12, 2010 in Chinese, claiming the priority benefit of Chinese Application No. 200910023607.0, filed Aug. 17, 2009, which is hereby incorporated by reference.

TECHNICAL FIELD

The invention belongs to the field of optical material, particularly relates to a process for preparing an optical colored polyester film using microwave technique.

BACKGROUND ART

Optical colored films have important uses, for example as optical filters or optical protection films, and as window films for automobile, domestic and office windows for adjusting sunlight irradiation in the energy-saving fields. The high-end optical colored films available currently are generally obtained by vacuum evaporation or plasma sputtering which has high cost and furthermore is only suitable for preparation of small-size samples due to limitation of the vacuum cavity and the size of target material.

The substrates of the optical colored films are generally polyester films. Large-scale industrial preparation of the optical colored films generally adopts the following techniques:

One known preparation method of a colored film relies upon adding a colorant into molten mass of polyester raw material and directly obtaining a colored film by blow molding through an extruder. The colored film obtained using the method has excellent performance, but this process is unrealistic for dyeing few films and is inconvenient for preparation of films needing frequently changing colors. Meanwhile, the transparence and grey of the film have certain defects.

Another known polyester film dyeing methods comprise a solvent method and a solvent-assisted method. The solvent method dyes a polyester film in organic solvent dissolved with a disperse dye, and the organic solvent acts as the dissolution medium of disperse dye and simultaneously has the swelling action on the polyester films so as to facilitate dye molecules to disperse inside the film. The solvent-assisted method utilizes a suspension of disperse dye in water phase to dye a film using the suspension around the boiling point of water by adding an appropriate organic solvent. Both the methods need processing around the boiling points of water phase and the solvent, have high solvent loss, need long time, and may not guarantee uniform dyeing of the films. Especially, long time results in great increase of cost, thereby being unfavorable for industrial production.

The Chinese patent No. CN1243133 discloses another method for preparing a colored film in which a disperse dye, a thickener and water are mixed to obtain a dye mixture with certain viscosity, followed by roller coating on a surface of a polyester film which is heated to enable the dye to thermally migrate into the film from the coating layer, and finally unwanted dye and water soluble thickener on the surface of the film are removed by alternating rinsing with solvent or cold and hot water to obtain the colored polyester film. The preparation method only can obtain the polyester film with one colored side, and dyeing two sides needs repeating the same process, thereby being cumbersome and inconvenient. In addition, uniform roller coating is a technical problem under optical grade requirement.

SUMMARY OF THE INVENTION

To overcome the defects of above prior art, the invention provides a process for preparing an optical colored polyester film using microwave technique, which aims at continuously dyeing polyester films using microwave dyeing technique to obtain an optical colored film.

Microwave generally may be classified into meter wave, centimeter wave and millimeter wave, and electromagnetic wave/microwave with the frequency of 300-300,000 MHz is generally applied in the fields of drying and the like. The electromagnetic wave/microwave with longer wavelength is widely used in other industrial departments, is used as a heat source in daily lives of people, may further be used for fixation in dyeing besides for drying in the industry of fabric dyeing, for example, high temperature fixation and textile printing fixation of terylene disperse dye, and may greatly reduce energy consumption, improve the utilization time of dyes and shorten the time.

Compared with the common colored film preparation technologies, the process for preparing an optical colored film using microwave technique has the following unique advantages: (1) microwave can instantaneously penetrate through the heated dye and film by just heating for a plurality of seconds to several minutes instead of pre-heating, stopping heating is instantaneous without residual heat, and the temperature rise speed is fast compared with the common electric heating modes; (2) as the heated object heats by itself and the ambient air, a device, etc. are not heated, no heat loss is produced, and the thermal efficiency is high; (3) all parts of the heated object simultaneously heat so that the internal part and the external part of the entire object may be uniformly heated and do not produce such larger temperature difference between the surface and the internal part generated by common conduction heating; (4) the temperature rise speed and the temperature control may be easily adjusted using the power of a microwave generator; and (5) apart from fast temperature rise effect, microwave can cause water and dye molecules to generate vibration to promote the dissolution and dispersing of the dye, thereby keeping the uniformity of liquid in a dyeing pool and avoiding film flaws caused by concentration difference of the dyeing pool. As a result, the microwave dyeing technique can greatly shorten the dyeing time, improve the dye uptake and guarantee the uniformity of a dyeing pool and the dye uptake uniformity compared with the common dyeing modes.

The process for preparing an optical colored polyester film using microwave technique disclosed by the invention comprises the following steps:

(1) conveying a polyester original film into a disperse dye suspension with steady water phase and simultaneously dyeing at the heating temperature of 80-85° C. for 10-120 seconds using microwave to heat the suspension;

(2) rinsing the colored film with water solution containing the mass ratio of 0.1-5 percent of surfactant till a thickener on the surface of the film is thoroughly rinsed off;

(3) re-rinsing the colored film after water rinsing with a solvent which is an organic solvent with a low boiling point preferably including ethanol, acetone or ethyl acetate and more preferably is the ethanol considering the toxic/side effect and rinsing effect; and (4) drying the colored film after solvent rinsing at the temperature of 130-170° C. for 10-120 seconds.

To achieve the purpose of the invention, the polyester preparation process disclosed by the invention is characterized by dyeing using a dyeing pool provided with a microwave generator which is positioned above liquid surface. To avoid the injury on human bodies caused by microwave leakage, the dyeing pool is closed. The microwave generator of the invention in which each microwave device has 1 KW power has adjustable power, and may be adjusted to treat the system by controlling the quantity of the microwave devices during use.

The polyester film of the invention is poly (ethylene glycol terephthalate), and other polyester films commercially available include polycarbonate films. The polyester original film may have the thickness of 5-250 μm, preferably 10-50 μm, readily available commercially.

The disperse dye suspension with steady water phase of the invention comprises a mixture system containing the following components in mass percentage: 50-90% of water, 0.1-5% of disperse dye, 0.1-5% of PH regulator and 8-50% of dye carrier. The mixture system may exhibit a viscosity of not more than 200 centipoises at ambient temperature, and may stably stands, i.e. the time having no deposit is more than 24 hours.

As metal ions in water, especially calcium ions and magnesium ions, may damage the stability of the disperse dye in water phase, the preferred water is purified water or ultrapure water containing no metal ions which may be obtained by filtering common tap water through ion exchange resin. When the resistance of water is larger than $10^4$ ohm, with the technique of the invention colored films with better performances may be obtained, and when the resistance of water is larger than $10^5$ ohm, best dyeing effect may be obtained.

The disperse dye of the invention is any of disperse dyes directly dyeing polyester commercially available. The dyeing solution system contains a minimum of 0.1% by weight, preferably 0.5%, more preferably 2%, which depends on the dyeing depth. The disperse dye is a mixture containing one or more than two components, for example, monogenetic dye including a disperse blue, or a disperse yellow or a disperse red, alternatively may be a mixture of monogenetic dyes of different proportions, for example, a three-color mixture of disperse blue, disperse red and disperse yellow dyes of different proportions, which may be selected to obtain grey or dark films through microwave dyeing.

The dye carrier of the utility model includes all polyhydroxy compounds with high boiling points having swelling action, for example glycerin, or propanediol or ethylene glycol. These polyhydroxy compounds are soluble in water, not only play the role of the dye carrier but also absorb water steam volatilizing during heating, thereby avoiding loss of water under the heating condition to some extent and keeping the stability of dye concentration. The addition amount of the dye carrier of the invention is 8-50% by weight of water, which is related with the temperature and depth of dyeing; when the dyeing temperature is high and the dyeing depth is dark, and the addition amount of the dye carrier is large; and low dyeing temperature or light colored films need small addition amount of the dye carrier. For dyeing a moderate colored film under the general temperature of 80-85° C., the addition amount of the dye carrier is preferably 20% or so by weight under the general temperature of 80-85° C. when a moderate colored film is colored.

The dye carrier has swelling action on the film, and may enter into film molecules to play the role of plasticization. The remained dye carrier in the film may influence subsequent processes for the colored film if incompletely removed, for example metallization, to result in difficult metallization of the polyester film or easy falling of the metal layer, and may be conveniently removed by a drying process above the flashing point which is below 160° C. selected in the invention after the colored film is rinsed.

The PH regulator of the utility model is selected according to the characteristic of the disperse dye, for example, for the disperse dye which generally fits for polyester dyeing and is generally in an acidic environment (PH=4.5-6.5), adding glacial acetic acid for regulation. Under some special situations, if the selected disperse dye fits for an alkaline environment, alkaline substances such as ammonia are necessarily added for regulation.

To guarantee the color depth of the film, the dyeing temperature lower limit is generally above 80° C., preferably above 81° C., more preferably 82° C. above. To reduce the volatilization of water as much as possible, the preferred temperature upper limit is generally below 85° C. The dyeing temperature may be measured and controlled by a non-touch infrared temperature measurement probe connected with a control switch of the microwave device.

As the microwave technique increases the dispersion of the dye in the film, the preparation process of the technique disclosed by the invention may be carried out under lower temperature compared with the prior solvent or solvent-assisted dyeing techniques, thereby reducing the loss of solvent and water, keeping the stability of the dye concentration and improving the dyeing uniformity.

The process for preparing an optical colored polyester film using microwave technique disclosed by the invention may shorten the preparation time and improve the processing efficiency and the uniformity of the film; and with the process of the invention, simultaneously dyeing two sides of the polyester film is convenient, the process is simple and stable, and is suitable for continuous industrial production.

Various optical colored polyester films obtained by the invention according to different uses and through adjustment of formulas may be used in different fields. For example, the colored polyester films obtained using the technique of the invention by adopting a colorant having absorption characteristic at a special wavelength may be used as a high-end optical filter or an optical protection film. The colored films obtained with the technique using a common dye commercially available may be used as window glass films for automobile, domestic and office windows.

BRIEF DESCRIPTION OF DRAWINGS

The FIGURE is a technological flow chart of the invention for preparing an optical colored polyester film.

EMBODIMENTS OF THE INVENTION

The invention is illustrated by the following examples, in which all parts, percentages and proportions are by weight unless otherwise specified.

Refer to the FIGURE, a non-colored polyester original film enters into a dyeing pool 2 via a transmission roller 1.

A polyester film is colored in a dyeing pool 2 which is provided with a microwave generator 3 and contains a disperse dye suspension with steady water phase at the dyeing temperature of 80-85° C. for 10-20 seconds which may be shortened when a light color film is prepared and may be correspondingly increased when a dark film is prepared.

A colored film 4 obtained is rinsed in a water rinsing pool 5 which contains a water solution containing a surfactant with the mass ratio of 0.1-5 percent, for example sodium dodecyl benzene sulfonate, to thoroughly remove a thickener on the surface of the film and may be heated, alternatively, a second water rinsing pool may even be arranged.

The colored film 4 after water rinsing is re-rinsed in a solvent rinsing pool 6, the solvents are generally organic solvents with low boiling points which may excellently dissolve disperse dye and dye carriers, preferred rinsing solvents include ethanol, acetone or ethyl acetate, more preferably the ethanol considering toxic/side effects and rinsing effect.

The colored film 4 after solvent rinsing enters into a drying tunnel 7 for drying treatment, which is used for drying the colored film 4 and removing the dye carrier inside the colored film 4 and fixing the dye using high temperature. The temperature of the drying channel is adjustable according to different dye carriers, preferably in the range of 130-170° C.; the drying time of the polyester film in the drying tunnel coincident with the dyeing time is adjustable between 10-120 seconds so that a plurality of groups of shorter drying tunnels may be designed; one group of drying tunnels may be used for drying for shorter time, and when the drying time required is longer, at least two groups of drying tunnels may be simultaneously used for drying.

The colored polyester film 4 after drying is wound after air cooling and the process is finished.

EXAMPLE 1

Red Film

Five parts of ethylene glycol, 0.2 parts of disperse bright red and 0.06 parts of HAC were added into 50 parts of disperse dye suspension with steady water phase, a microwave device with the power of 5 KW was turned on and dyeing was carried out by controlling the temperature of 85° C.; and rinsing was carried out with hot water added with 2% sodium dodecyl benzene sulfonate, then rinsing was carried out with ethanol, drying was carried out at 150° C. for 30 seconds in a drying tunnel, and a vivid red polyester film was obtained.

The film before and after dyeing was taken to make test using a transmittance testing instrument, and for the transmittance change of the film under visible light with dyeing time change see Table 1.

TABLE 1

| Transmittance change of film prepared using microwave technique with dyeing time change | | | | | |
|---|---|---|---|---|---|
| Dyeing time (s) | 0 | 10 | 30 | 60 | 120 |
| Visible light transmittance (%) | 88 | 65 | 53 | 41 | 45 |

See Table 2 for the visible light transmittance change of the film with time change dyed using the common solvent-assisted method instead of microwave dyeing technique according to the same formula as above under the electric heating temperature of 95° C.

TABLE 2

| Transmittance change of film prepared using solvent-assisted technique with dyeing time change | | | | | |
|---|---|---|---|---|---|
| Dyeing time (s) | 0 | 10 | 30 | 60 | 120 |
| Visible light transmittance (%) | 88 | 72 | 66 | 57 | 48 |

EXAMPLE 2

Solvent Resistance

A film was dyed using the formula and microwave technique of Example 1. After dried at 150° C., the dye was fixed in the polyester film and had good solvent resistance. Table 3 shows the transmittance change of the 120-second colored film after soaked for 30 minutes in different solvents.

TABLE 3

| Solvent resistance of colored film | | | | | | | | |
|---|---|---|---|---|---|---|---|---|
| Soaking by solvent for 30 min | No soaking | ethyl methyl ketone | toluene | ethyl acetate | petroleum ether | acetone | ethanol | tetrahydrofuran |
| Visible light transmittance (%) | 48 | 52 | 51 | 53 | 50 | 52 | 52 | 55 |

After dried at 130-170° C., the dye carrier remained in the film was thoroughly removed, and the films of 10 g were selected to make comparison of the weight before and after dyeing, for the results see Table 4. From the table may find that the dye carrier remained in the film gradually volatilizes with the increase of the drying time and drying temperature. It is to be noted that the weight of the colored film is smaller than that of the original film when the drying temperature and drying time of the film increase, which is caused by that a plasticizer component originally added in the polyester film volatilized at high temperature from the film, and in order not to influence the performance of the polyester original film, appropriate selection of drying time and drying temperature is necessary.

TABLE 4

Influence of drying temperature and drying time on weight of colored film

| Drying temperature | Drying time | | | | | | | Non-colored original film |
|---|---|---|---|---|---|---|---|---|
| | 0 s | 10 s | 20 s | 30 s | 45 s | 60 s | 120 s | |
| 130° C. | 10.6609 g | 10.5463 | 10.4342 | 10.2865 | 10.2223 | 10.1868 | 10.1433 | 10.1321 g |
| 140° C. | 10.6586 | 10.3821 | 10.2927 | 10.2375 | 10.1715 | 10.1344 | 10.1223 | 10.1212 |
| 150° C. | 10.6875 | 10.3521 | 10.2625 | 10.2023 | 10.1675 | 10.1543 | 10.1324 | 10.1652 |
| 160° C. | 10.6759 | 10.3489 | 10.2143 | 10.1625 | 10.1532 | 10.1312 | 10.1015 | 10.1569 |
| 170° C. | 10.6613 | 10.3011 | 10.1815 | 10.1031 | 10.0705 | 10.0031 | 9.9765 | 10.1235 |

EXAMPLE 3

Yellow Film

Example 1 was repeated, with the following deference. The 0.2 parts of disperse bright red in the disperse dye suspension with steady water phase in Example 1 was replaced by 0.2 parts of disperse golden yellow. A vivid golden yellow polyester film was obtained according to the same technological conditions.

The film before and after dyeing was taken to make test using a transmittance testing instrument, and for the visible light transmittance change of the film with dyeing time change see Table 5.

TABLE 5

Transmittance of yellow film under different dyeing times

| Dyeing time (s) | 0 | 10 | 30 | 60 | 120 |
|---|---|---|---|---|---|
| Visible light transmittance (%) | 88 | 83 | 77 | 74 | 70 |

EXAMPLE 4

Blue Film

Example 1 was repeated, with the following difference. The 0.2 parts of disperse bright red in the disperse dye suspension with steady water phase in Example 1 was replaced by 0.2 parts of disperse blue. A vivid azure polyester film was obtained according to the same technological conditions.

The film before and after dyeing was taken to make test using a transmittance testing instrument, and for the transmittance change of the film under visible light with different dyeing times see Table 6.

TABLE 6

Transmittance of blue film under different dyeing time

| Dyeing time (s) | 0 | 10 | 30 | 60 | 120 |
|---|---|---|---|---|---|
| Visible light transmittance (%) | 88 | 72 | 64 | 59 | 51 |

EXAMPLE 5

Dark Blue Polyester Film

The invention not only is suitable for preparation of monochromatic films as well as preparation of mixed colored films of more than two dyes.

Ten parts of ethylene glycol, 0.1 parts of disperse bright red, 0.1 parts of golden yellow, 0.1 parts of disperse blue and 0.06 parts of HAC were added into 50 parts of disperse dye suspension with steady water phase, and dyeing was carried out with microwave technique in a dyeing pool at 85° C. for 30 seconds; rinsing was carried out with hot water added with 2% sodium dodecyl benzene sulfonate, then rinsing was carried out with ethanol, and drying was carried out for 30 seconds at 150° C.; and a vivid uniform dark blue polyester film was obtained. The visible light transmittance of the film was 65%.

EXAMPLE 6

Greenblack Polyester Film

A dark film may be obtained with the invention through adjusting dye components and dyeing time.

Ten parts of ethylene glycol, 0.1 parts of disperse black, 0.15 parts of golden yellow, 0.15 parts of disperse bright red and 0.06 parts of HAC were added into 50 parts of disperse dye suspension with steady water phase, and dyeing was carried out with microwave technique in a dyeing pool at 85° C. for one minute; rinsing was carried out with hot water added with 2% sodium dodecyl benzene sulfonate, then rinsing was carried out with ethanol, drying was carried out for 30 seconds at 150° C., and a vivid uniform greenblack polyester film was obtained. The visible light transmittance of the film was 45%.

EXAMPLE 7

Black Polyester Film

A darker film may be obtained with the invention through adjusting dye components and dyeing time.

Ten parts of ethylene glycol, 0.3 parts of disperse black, 0.1 parts of golden yellow, 0.1 parts of disperse bright red and 0.06 parts of HAC into 50 parts of disperse dye suspension with steady water phase, and dyeing was carried out with microwave technique in a dyeing pool at 85° C. for one minute; rinsing was carried out with hot water added with 2% sodium dodecyl benzene sulfonate, then rinsing was carried out with ethanol, and drying was carried out for 30 seconds at 150° C., and a vivid uniform black polyester film was obtained. The visible light transmittance of the film was 5%.

In the FIGURE: 1-conveying roller; 2-dyeing pool; 3-microwave generator; 4-colored film; 5-water rinsing pool; 6-solvent rinsing pool; and 7-drying tunnel.

The invention claimed is:
1. A process for preparing an optical colored polyester film using microwave technique comprising the following steps:

(1) conveying a non-colored polyester film into a disperse dye suspension with a steady water phase and simultaneously dyeing at the heating temperature of 80-85° C. for 10-120 seconds using microwave technique;

(2) rinsing the colored film with a water solution containing the mass ratio of 0.1-5 percent of surfactant until a thickener on the surface of the film is thoroughly rinsed off;

(3) re-rinsing the colored film after water rinsing with a solvent which includes ethanol, acetone or ethyl acetate; and (4) drying the colored film after solvent rinsing at the temperature of 130-170° C. for 10-120 seconds.

2. The process according to claim 1, characterized in that the disperse dye suspension with a steady water phase comprises a mixture system containing the following components by mass percentage: 50-90% of water, 0.1-5% of disperse dye, 0.1-0.5% of pH regulator and 8-50% of dye carrier.

3. The process according to claim 1, characterized in that the water in the disperse dye suspension with a steady water phase is purified water with the resistance of more than $10^4$ ohm.

4. The process according to claim 1, characterized in that the disperse dye is a mixture of any one disperse dye or at least two disperse dyes directly dyeing polyester.

5. The process according to claim 1, characterized in that the dye carrier is polyhydroxy compound with the flash point of below 160° C. and having swelling action on the polyester film.

6. The process according to claim 1, characterized in that the surfactant is a sodium dodecyl benzene sulfonate water solution with the mass ratio of 0.1-5%.

7. The process according to claim 2, characterized in that the water in the disperse dye suspension with a steady water phase is purified water with the resistance of more than $10^4$ ohm.

8. The process according to claim 2, characterized in that the disperse dye is a mixture of any one disperse dye or at least two disperse dyes directly dyeing polyester.

9. The process according to claim 2, characterized in that the dye carrier is polyhydroxy compound with the flash point of below 160° C. and having swelling action on the polyester film.

\* \* \* \* \*